United States Patent
Chen et al.

(10) Patent No.: US 9,904,822 B1
(45) Date of Patent: Feb. 27, 2018

(54) NON-CONTACT CARD READER

(71) Applicant: UNIFORM INDUSTRIAL CORP., New Taipei (TW)

(72) Inventors: Yu-Tsung Chen, New Taipei (TW); Chun-Yin Wu, New Taipei (TW)

(73) Assignee: UNIFORM INDUSTRIAL CORP., New Taipei (TW)

( * ) Notice: Subject to any disclaimer, the term of this patent is extended or adjusted under 35 U.S.C. 154(b) by 0 days.

(21) Appl. No.: 15/612,347

(22) Filed: Jun. 2, 2017

(30) Foreign Application Priority Data

Dec. 29, 2016 (TW) .............................. 105220009 U (51) Int. Cl.
*G06K 7/10* (2006.01)

(52) U.S. Cl.
CPC ..... *G06K 7/10297* (2013.01); *G06K 7/10316* (2013.01); *G06K 7/10722* (2013.01); *G06K 7/10821* (2013.01)

(58) Field of Classification Search
CPC ...... G06K 7/00; G06K 7/0008; G06K 7/0004; G06K 13/08; G06K 7/0021
USPC ........................................ 235/439, 440, 486
See application file for complete search history.

(56) References Cited

U.S. PATENT DOCUMENTS

| | | | | |
|---|---|---|---|---|
| 6,890,260 B2 * | 5/2005 | Ollins | ..................... | G07F 17/32 385/123 |
| 7,311,257 B2 * | 12/2007 | Silverbrook | ......... | B41J 2/14427 235/454 |
| 2011/0011935 A1 * | 1/2011 | Takahashi | ............ | G06K 7/0008 235/439 |
| 2015/0287289 A1 * | 10/2015 | Lewis | ................... | G07F 19/201 235/379 |
| 2017/0132437 A1 * | 5/2017 | Watanabe | ............ | G06K 7/0013 |

* cited by examiner

*Primary Examiner* — Daniel Hess
(74) *Attorney, Agent, or Firm* — Muncy, Geissler, Olds & Lowe, P.C.

(57) ABSTRACT

A non-contact card reader is provided, including: an antenna module, a spacer, multiple light pipes, and a panel housing. The antenna module includes a first board, a second board, an antenna, and multiple light-emitting components. The second board includes a surrounding area in which the antenna is disposed and a central area that is located at a center of the surrounding area and in which the multiple light-emitting components are disposed. The spacer is combined with the multiple light pipes and disposed between the first board and the second board. A single type of antenna module may be installed in the vertical housing, the horizontal housing, or the square housing of the panel housing in a fixed direction, thereby improving applicability of the antenna module.

9 Claims, 7 Drawing Sheets

NON-CONTACT CARD READER

CROSS-REFERENCE TO RELATED APPLICATION

This non-provisional application claims priority under 35 U.S.C. § 119(a) to Patent Application No. 105220009 filed in Taiwan, R.O.C. on Dec. 29, 2016, the entire contents of which are hereby incorporated by reference.

BACKGROUND

Technical Field

The present invention relates to a card reader, and in particular, to a non-contact card reader.

Related Art

With development of science and technologies, a health insurance card, a credit card, a financial card, an identity card, a passport, and the like that need to be used in daily life are developed into magnetic stripe cards or digital identification cards having an IC chip. Some materials of a user are recorded on the digital identification cards. For example, a non-contact travel payment system is used in a ticket system. In recent years, because a technology of a radio frequency identification (RFID) system becomes gradually mature, many credit cards and financial cards show up on the market in forms of non-contact cards.

A non-contact card transaction behavior needs to be internationally certified. The certification stipulates that a design of a certified non-contact card reader includes unique mutual directivity between a design configuration and a non-contact card. Therefore, it is not allowed to change any angle of an entire module to satisfy different appearance requirements of a non-contact card reader. The non-contact card reader cannot be sold unless more additional costs are spent and another single-angle certification is additionally applied for. Therefore, a disposing direction and appearance variance of a product are limited, and more time and costs are needed in this solution.

An EMV international certification condition includes: directivity of an antenna module inside a non-contact card reader, directivity of a contactless symbol on the non-contact card reader, and a position limitation that an induction lamp is located on the top of the non-contact card reader. Therefore, it shows that after a card scanning direction is approved, when a non-contact card is scanned, a chip may guide the card near a central point of the non-contact card reader for sensing. In other words, the card scanning symbol on a housing of the non-contact card reader corresponds to the antenna module inside the non-contact card reader. A direction of the non-contact card near the card scanning symbol also corresponds to and is associated with positions of the card scanning symbol, the antenna module, and the induction lamp. All these need to satisfy the EMV international certification condition. If a direction of any one of the card scanning symbol, the card scanning direction, or the antenna module is reversed or a position thereof is changed, the EMV international certification condition is not satisfied.

Figure 1:
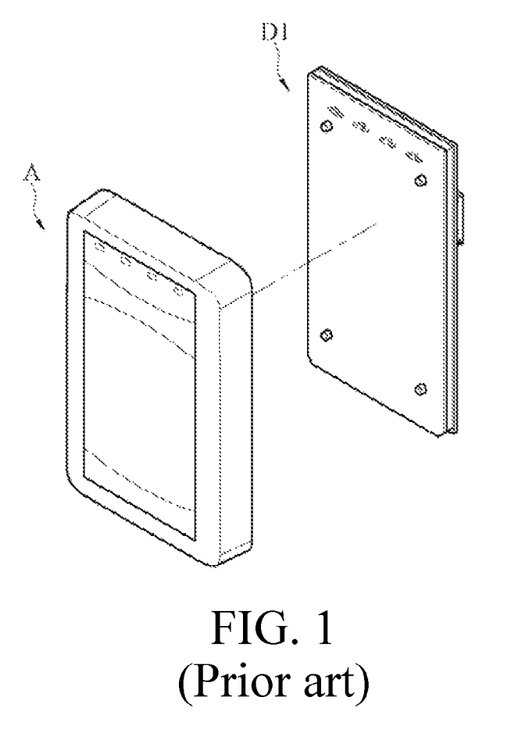
FIG. 1 is a schematic exploded view of a vertical non-contact card reader and an antenna module in the prior art.
Figure 2:
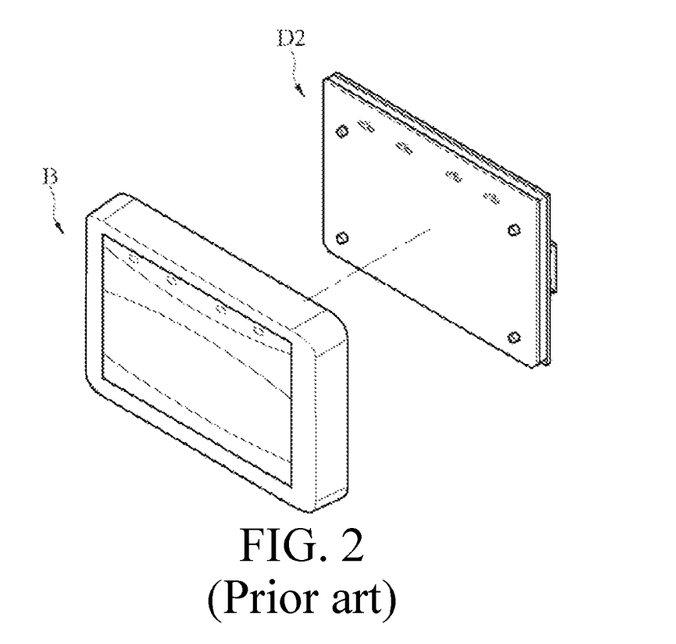
FIG. 2 is a schematic exploded view of a horizontal non-contact card reader and an antenna module in the prior art.
Figure 3:
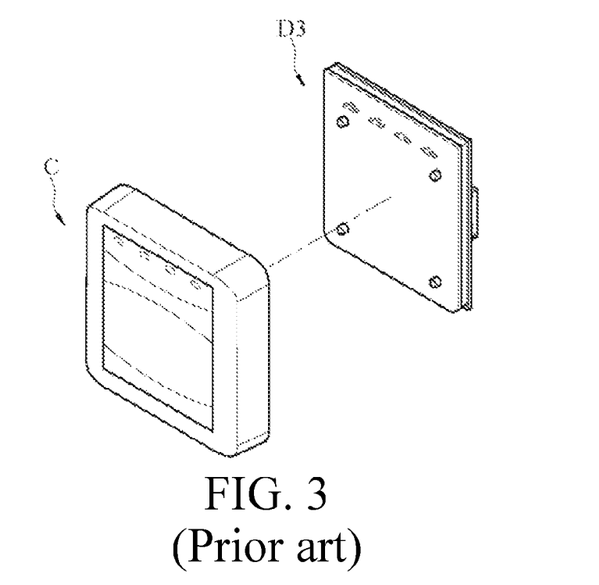
FIG. 3 is a schematic exploded view of a square non-contact card reader and an antenna module in the prior art.

Non-contact card readers on the market have multiple specifications and shapes. There are vertical non-contact card readers, horizontal non-contact card readers, and square non-contact card readers. Referring to FIG. 1 to FIG. 3, FIG. 1 to FIG. 3 are schematic exploded views in the prior art. FIG. 1 is an embodiment of a vertical non-contact card reader A and an antenna module D1. FIG. 2 is an embodiment of a horizontal non-contact card reader B and an antenna module D2. FIG. 3 is an embodiment of a square non-contact card reader C and an antenna module D3. Lengths and widths of housings of the non-contact card readers are different. Multiple specifications are accordingly designed for the antenna module D1/D2/D3 in the non-contact card reader. Due to the requirements of the EMV certification condition, the non-contact card is close to the direction of the card scanning symbol and the disposing direction of the card scanning symbol. Positions of the antenna module and the induction lamp are mutually associated and fixed. The direction of the card scanning symbol, the disposing direction of the card scanning symbol, and a position of the induction lamp on the housing cannot be arbitrarily changed. Moreover, when the antenna module D1/D2/D3 is installed by uniformly using one disposing direction, the antenna module D1/D2/D3 cannot be applied to multiple types of non-contact card readers. Consequently, processing procedures and costs of the multiple types of antenna modules D1/D2/D3 are increased. How to resolve the existing problem needs to be tackled by a person related in the art.

SUMMARY

In view of the foregoing problem, a certified module design is defined to be unique, so that a relative space relationship between a motherboard and an antenna is fixed, while designs, which are not related to a certification requirement, of directivity of light pipes and light guide holes (lamp holes) of a panel housing are made to be changeable. In other words, directions and positions of the light pipes and the light guide holes (lamp holes) on the panel housing are changeable. Parts of the light pipes can be arbitrarily changed according to different requirements, and still fall within a range permitted by certification.

The present invention provides a non-contact card reader, including: an antenna module, a spacer, multiple light pipes, and a panel housing. The antenna module includes a first board, a second board, an antenna, and multiple light-emitting components. The second board includes a surrounding area and a central area located at a center of the surrounding area. The antenna is disposed in the surrounding area. The multiple light-emitting components are located in the central area. The spacer is located between the first board and the second board. The spacer includes multiple spacer blocks. The multiple light pipes are arranged at intervals and disposed between the first board and the second board. The light pipes are combined with the spacer, and the spacer blocks are located between the light pipes. Ends of the light pipes respectively correspond to the light-emitting components. Other ends of the light pipes separately extend to a lateral end of the second board. The panel housing is selected from the group consisting of a vertical housing, a horizontal housing, and a square housing. The panel housing includes an accommodating slot for accommodating the antenna module and multiple light guide holes adjacent to the other ends of the light pipes. The antenna module is installed in the vertical housing, the horizontal housing, or the square housing in a fixed direction.

In an embodiment, the spacer comprises a slot, and the light-emitting components are disposed in the slot.

In an embodiment, the spacer includes a slot, and the antenna is symmetrically disposed in the surrounding area on one side of the second board.

In an embodiment, the light-emitting components are disposed on the other side of the second board and are located between the first board and the second board.

In an embodiment, the non-contact card reader further includes: a back cover, fastened on a side wall of the panel housing and covering the accommodating slot.

In an embodiment, the panel housing comprises: multiple fixed blocks, located on an internal side of the accommodating slot and abutting on a lateral end of the antenna module.

In an embodiment, the other ends of the light pipes extend out of the first board and the second board and obliquely extend toward a lateral end of the second board.

In an embodiment, the other ends of the light pipes comprise a horizontal drawing segment corresponding to the light guide holes.

In an embodiment, the other ends of the light pipes comprise a vertical drawing segment corresponding to the light guide holes.

Multiple light pipes are combined between a first board and a second board of an antenna module. After the antenna module is installed on a panel housing, a total thickness is relatively small, and is merely a thickness of the panel housing plus a thickness of the antenna module. The antenna module may be produced, and assembled in a modular manner in advance to simplify a processing procedure and reduce costs, and can be simply installed in different types of panel housings, thereby improving assembling convenience. In this way, the antenna module is applicable to panel housings having different shapes. Moreover, a panel housing may be assembled and combined with the antenna module while no excessively complex structure is designed inside the panel housing.

In addition, a housing of the non-contact card reader is selected from a vertical housing, a horizontal housing, and a square housing to satisfy different product requirements. The antenna module may be installed in the vertical housing, the horizontal housing, or the square housing in a fixed direction. A same type of antenna modules may be installed in the vertical housing, the horizontal housing, or the square housing as long as satisfying certification. It is unnecessary to design antenna modules of multiple specifications for installation in the vertical housing, the horizontal housing, or the square housing having a different shape.

Detailed features and advantages of the present invention are described in detail in the following implementation manners. The content enables any person skilled in the art to know technical content of the present invention and implement the technical content. A person skilled the art can easily understand the objectives and advantages of the present invention according to the content, the application scope, and drawings disclosed in this specification.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 4:
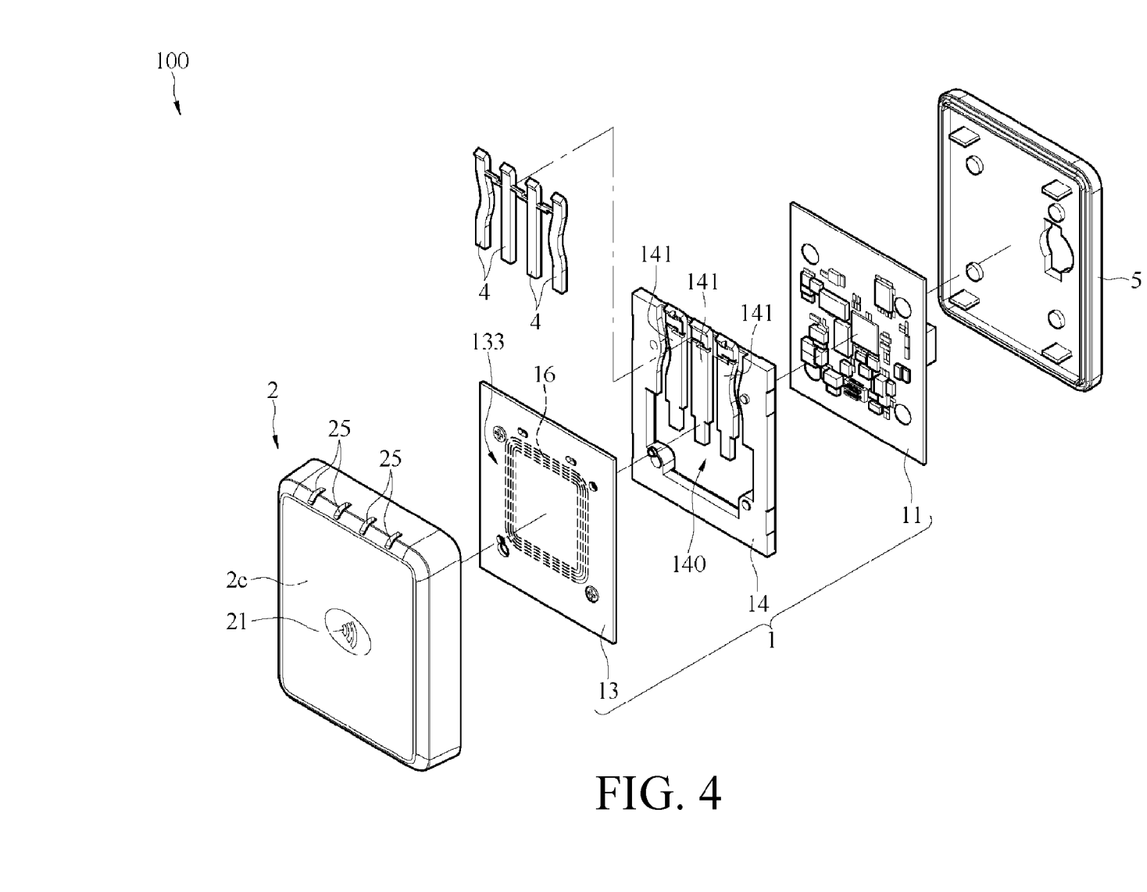
FIG. 4 is a schematic exploded front view of a first embodiment according to the present invention.
Figure 5:
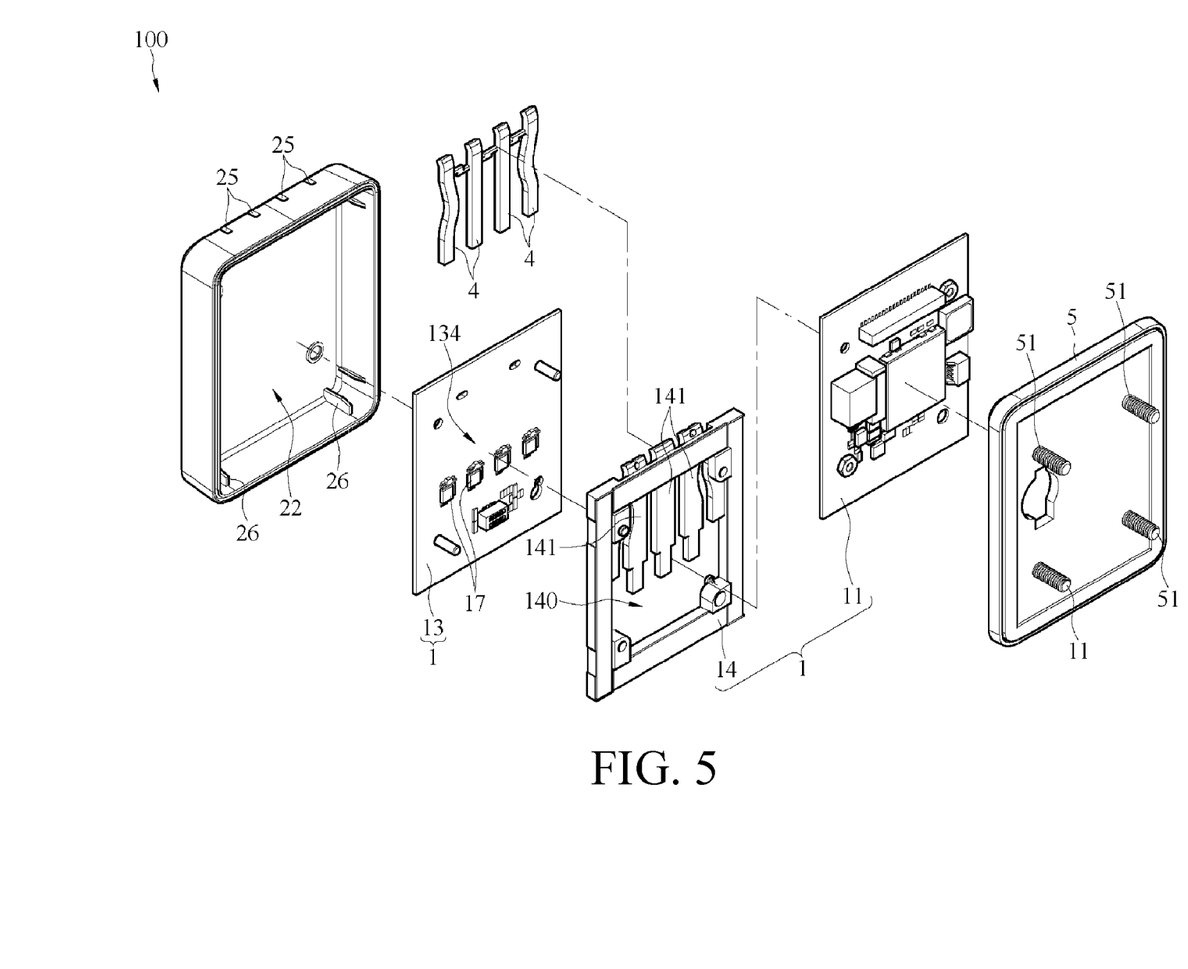
FIG. 5 is a schematic exploded rear view of a first embodiment according to the present invention.

Referring to FIG. 4 and FIG. 5, FIG. 4 and FIG. 5 show a first embodiment of a non-contact card reader 100 of the present invention. A square housing 2c is used as a panel housing 2 of the first embodiment for description. FIG. 4 is a schematic exploded front view. FIG. 5 is a schematic exploded rear view. The non-contact card reader 100 of the present invention is configured to read a non-contact card. The non-contact card is a radio frequency identification (RFID) chip. The non-contact card is a ticket, a cash card, a financial card, or a credit card. The non-contact card reader 100 generates a current by means of electromagnetic induction and actuates the non-contact card. The non-contact card transmits an analog signal.

Referring to FIG. 4, in this embodiment, the non-contact card reader 100 includes an antenna module 1 and multiple light pipes 4. The antenna module 1 includes a first board 11, a second board 13, an antenna 16, and multiple light-emitting components 17.

Figure 6:
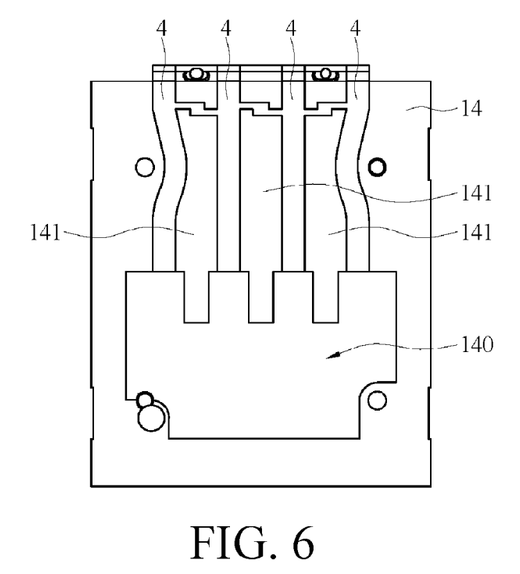
FIG. 6 is a schematic front view of light pipes and a spacer of a first embodiment according to the present invention.

Referring to FIG. 4, FIG. 5, and FIG. 6, FIG. 6 is a schematic front view of the light pipes and a spacer. The first board 11, the multiple light pipes 4, and the second board 13 are overlapped. The first board 11 includes multiple electronic circuit components (for example, a processor chip and a buzzer). The first board 11 is connected to the second board 13 by using a connector. In addition, lengths and widths of the first board 11 and the second board 13 are the same. The second board 13 includes a surrounding area 133 and a central area 134 located at a center of the surrounding area 133. The antenna 16 is disposed in the surrounding area 133 on one side of the second board 13. The antenna 16 is symmetrically disposed in the surrounding area 133.

Referring to FIG. 4, FIG. 5, and FIG. 6, the multiple light-emitting components 17 are located in the central area 134 on the other side of the second board 13 and are transversely arranged. In this embodiment, the multiple light-emitting components 17 are disposed on the other side of the second board 13 and located between the first board 11 and the second board 13. However, this does not limit a manner in which the multiple light-emitting components 17 are disposed on the second board 13. In some implementation aspects, the multiple light-emitting components 17 may further be disposed on the first board 11. In other words, the multiple light-emitting components 17 may be disposed on the second board 13 having the antenna 16, or the multiple light-emitting components 17 may be disposed on the first board 11 having multiple electronic circuit components.

Referring to FIG. 4, FIG. 5, and FIG. 6, the multiple light pipes 4 are striped transparent structures each. The light pipes 4 are arranged at intervals and disposed between the first board 11 and the second board 13. Ends of the light pipes 4 respectively correspond to the multiple light-emitting components 17. Other ends of the light pipes 4 separately extend to a lateral end of the second board 13. Herein, the other ends of the light pipes 4 extend out of the first board 11 and the second board 13 and obliquely extend toward the lateral end of the second board 13, so that the other ends the light pipes 4 are close to an internal side face of the panel housing 2. The other ends of the light pipes 4 separately extend to a position near multiple light guide holes 25.

The multiple light pipes 4 are combined between the first board 11 and the second board 13 of the antenna module 1. A total thickness of the antenna module 1 merely includes thicknesses of the first board 11, the second board 13, and the light pipes 4, thereby effectively reducing the total thickness installed in the panel housing 2. That is, the multiple light pipes 4 in this embodiment are not disposed in the panel housing 2 in advance. If the multiple light pipes 4 are disposed in the panel housing 2, the panel housing 2 further includes the antenna module 1, and the light pipes 4 and the antenna module 1 are piled up in the panel housing 2, and the total thickness is relatively large, which is the panel housing 2 plus thicknesses of the light pipes 4 and the antenna module 1. The multiple light pipes 4 in this embodiment are formed in the antenna module 1. A width of the antenna module 1 is merely a sum of the thicknesses of the first board 11, the light pipes 4, and the second board 13. After the antenna module 1 is disposed in the panel housing 2, the total thickness is merely the thickness of the panel housing 2 plus the thickness of the antenna module 1.

The multiple light-emitting components 17 may separately or simultaneously emit different colors of light sources. The light sources are respectively transmitted to the multiple light guide holes 25 on the panel housing 2. A user may observe prompt light on a surface of the panel housing 2 and learn a use status of the non-contact card reader 100.

Referring to FIG. 4, FIG. 5, and FIG. 6, in this embodiment, the antenna module 1 further includes the spacer 14. The spacer 14 is located between the first board 11 and the second board 13 and is combined with the multiple light pipes 4. Herein, the spacer 14 is a rectangular board. A length and a width of the spacer 14 are the same as that of the first board 11 and the second board 13. The spacer 14 and the multiple light pipes 4 are combined in a dual-material dual-color injection molding manner. The other ends of the light pipes 4 extend out of the lateral end of the spacer 14.

That the spacer 14 is combined with the multiple light pipes 4 in a dual-material dual-color injection molding manner is merely an example, and constitutes no limitation. In some implementation aspects, the spacer 14 and the multiple light pipes 4 may be combined in a single-material single-color injection molding manner. Moreover, the spacer 14 and the multiple light pipes 4 may be combined in an assembly manner to form a component. For example, the spacer 14 is a black plastic component (whose material is PC+ABS), while the light pipes 4 is a transparent plastic component (whose material is PC). The two may be assembled in a fixed manner to form a component, and then are disposed between the first board 11 and the second board 13. In addition, the spacer 14 and the multiple light pipes 4 may be combined in a single-material dual-color manner, a dual-material single-color manner, or the like.

Referring to FIG. 4, FIG. 5, and FIG. 6, in this embodiment, a slot 140 is included in an approximate central position of the spacer 14. When the first board 11, the second board 13, and the spacer 14 are piled up, the multiple light-emitting components 17 are disposed in the slot 140. Ends of the light pipes 4 extend to the slot 140 and correspond to the light-emitting components 17.

Referring to FIG. 4, FIG. 5, and FIG. 6, in this embodiment, the spacer 14 includes multiple spacer blocks 141, which are located between the light pipes 4. The spacer blocks 141 and the light pipes 4 are manufactured by using different materials or different colors. Therefore, the spacer blocks 141 can segregate the light sources transmitted by the light pipes 4, and the light sources transmitted by the light pipes 4 do not interfere with each other.

Referring to FIG. 4, FIG. 5, and FIG. 6, the non-contact card reader 100 further includes the panel housing 2. The panel housing 2 is a recessed case. The panel housing 2 includes an accommodating slot 22 and the multiple light guide holes 25. The accommodating slot 22 accommodates the antenna module 1. The multiple light guide holes 25 are formed on the surface of the panel housing 2. The multiple light guide holes 25 on the internal side face of the panel housing 2 are adjacent to the other ends of the light pipes 4. Herein, the panel housing 2 is selected from the group consisting of a vertical housing 2a, a horizontal housing 2b, and a square housing 2c (for example, the square housing 2c in FIG. 4, the horizontal housing 2b in FIG. 7, and the vertical housing 2a of FIG. 8).

Referring to FIG. 4, FIG. 5, and FIG. 6, the panel housing 2 may be assembled and combined with the antenna module 1 while no excessively complex structure is designed inside the panel housing 2. The antenna module 1 and the panel housing 2 can be assembled by simply installing the antenna module 1 to the panel housing 2. In this embodiment, the panel housing 2 includes the multiple fixed blocks 26. The multiple fixed blocks 26 are located on an internal side of the accommodating slot 22 and abut on the lateral end of the antenna module 1. The antenna module 1 may be disposed in the accommodating slot 22 in a simple installation manner, so that an edge of the antenna module 1 is in contact with the fixed blocks 26, to fix the antenna module 1.

Referring to FIG. 4, FIG. 5, and FIG. 6, in this embodiment, the non-contact card reader 100 further includes a back cover 5. The back cover 5 is fastened onto the side wall of the panel housing 2 and covers the accommodating slot 22, and is locked to an external work component by using multiple locking components 51 on the back cover 5.

Referring to FIG. 5, the antenna module 1 and multiple types of multiple light pipes 4 designed in advance, for example, a type of the multiple light pipes 4 applied to the square housing 2c in FIG. 4, can satisfy requirements of different panel housings. Lengths of the other ends of the light pipes 4 only need to slightly protrude and extend to the lateral end of the second board 13.

Figure 7:
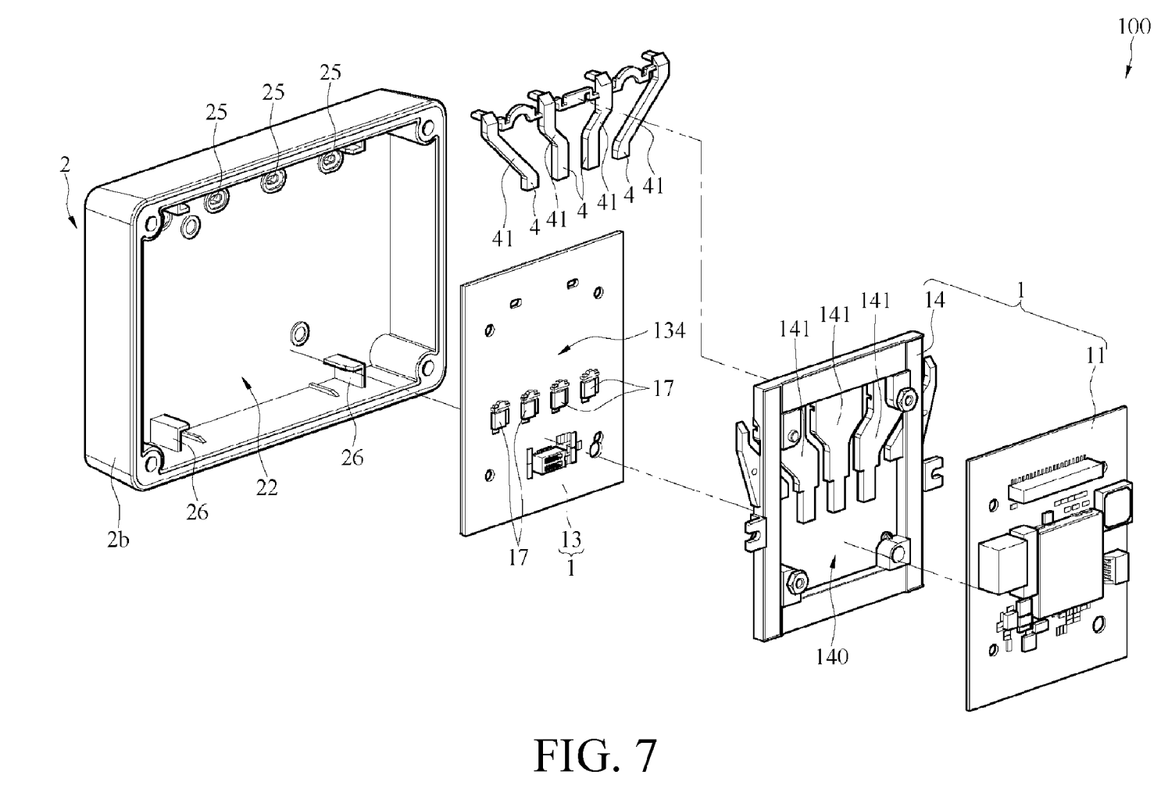
FIG. 7 is a schematic exploded view of a second embodiment according to the present invention.

Referring to FIG. 7, FIG. 7 is a schematic exploded view of a second embodiment. A biggest difference between this embodiment and the first embodiment is that a panel housing 2 of a non-contact card reader 100 is a horizontal housing 2b, while the panel housing 2 in the first embodiment is the square housing 2c. When the horizontal housing 2b in FIG. 7 is applied, the horizontal housing 2b has a larger width. Transverse intervals between multiple light guide holes 25 are relatively increased. Herein, the type of the multiple light pipes 4 is designed to satisfy the intervals of the multiple light guide holes 25 to guide a light source. Herein, other ends of the light pipes 4 include a horizontal drawing segment 41. Distances of the other ends of the light pipes 4 are increased by using the horizontal drawing segment 41, so that an end of the horizontal drawing segment 41 of the other ends of the light pipes 4 corresponds to the light guide holes 25.

Figure 8:
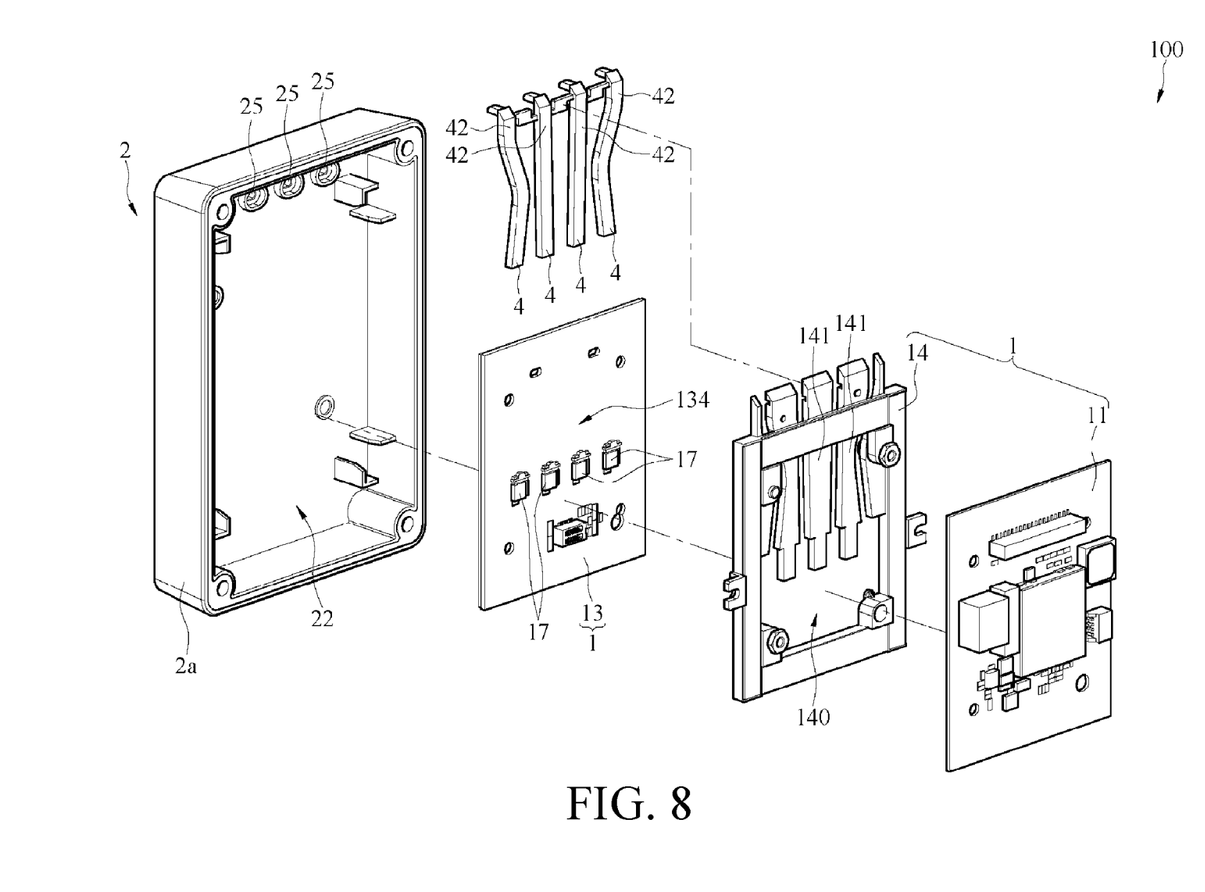
FIG. 8 is a schematic exploded view of a third embodiment according to the present invention.

Referring to FIG. 8, FIG. 8 is a schematic exploded view of a third embodiment. A biggest difference between this embodiment and the first embodiment is that a panel housing 2 of a non-contact card reader 100 is a vertical housing 2a, while the panel housing 2 in the first embodiment is the square housing 2c. When the vertical housing 2a in FIG. 8 is applied, the vertical housing 2a has a larger length. Distances between locations of multiple light guide holes 25 are increased. Herein, the type of the multiple light pipes 4 is designed to satisfy the intervals of the multiple light guide holes 25 to guide a light source. Herein, other ends of the light pipes 4 include a vertical drawing segment 42. Distances of the other ends of the light pipes 4 are increased by using the vertical drawing segment 42, so that an end of the vertical drawing segment 42 of the other ends of the light pipes 4 corresponds to the light guide holes 25.

Referring to FIG. 4, FIG. 5, and FIG. 6, the antenna module 1 is installed in the square housing 2c in a fixed direction. In addition, the antenna module 1 is further installed in the vertical housing 2a or the horizontal housing 2b (which is the square housing 2c in FIG. 5, the horizontal housing 2b in FIG. 7, and the vertical housing 2a in FIG. 8) in a fixed direction. That is, the antenna module 1 may be installed in the vertical housing 2a, the horizontal housing 2b, or the square housing 2c at a same installation angle. The antenna module 1 may be installed in the vertical housing 2a, the horizontal housing 2b, or the square housing 2c without changing the direction. Herein, the housing of the non-contact card reader 100 may be selected from the vertical housing 2a, the horizontal housing 2b, or the square housing 2c according to different product requirements. A same type of antenna module 1 may be installed in the vertical housing 2a, the horizontal housing 2b, or the square housing 2c, and it is unnecessary to design antenna modules 1 of multiple specifications for installation in panel housings 2 having different shapes. That is, the antenna module 1 may be produced and manufactured in a modular manner to simplify a processing procedure and reduce costs. The antenna module 1 may be simply installed in different types of panel housings 2, thereby improving assembling convenience.

Required by an EMV certification condition, a non-contact card is fixed relative to a direction of a card scanning symbol 21 on a surface of the panel housing 2, a disposing direction of the card scanning symbol 21, and positions of an antenna module 1b and a light guide hole 25. A position of the non-contact card relative to the direction of the card scanning symbol 21 on the surface of the panel housing 2, the disposing direction of the card scanning symbol 21, and the positions of the light guide hole 25 and the antenna module 1 cannot be arbitrarily changed. However, in this embodiment, the panel housing 2, the antenna module 1, the light pipes 4, the spacer 14, and the card scanning symbol 21 are separated from each other, so that there is no restrictive relationship between directions or positions. The certified antenna module 1 is designed to be unique, so that the antenna module 1 may be installed in the vertical housing 2a, the horizontal housing 2b, or the square housing 2c in a fixed direction by fixing a relative space relationship between the first board 11 and the antenna 16. It is unnecessary to design antenna modules 1 of multiple specifications for installation in the vertical housing 2a, the horizontal housing 2b, or the square housing 2c having different shapes. Moreover, it is unnecessary to consider the panel housings 2 having different shapes. The antenna module 1 may be installed in the vertical housing 2a, the horizontal housing 2b, the square housing 2c by keeping a forward direction. Herein, the antenna module 1 may be installed in the vertical housing 2a, the horizontal housing 2b, or the square housing 2c by using a disposing direction of a single type of antenna module 1, thereby improving applicability of the antenna module 1. In addition, the antenna module 1 applicable to multiple types of panel housings 2 only needs to be certified once. The antenna module 1 only needs to cooperate with light pipes 4 having different designs, so that the light pipes 4 may be correspondingly disposed and extended to the top of various types of panel housings 2.

A housing of the non-contact card reader is selected from a vertical housing, a horizontal housing, and a square housing to satisfy different product requirements. The antenna module may be installed in the vertical housing, the horizontal housing, or the square housing in a fixed direction. A same type of antenna modules may be installed in the vertical housing, the horizontal housing, or the square housing as long as satisfying certification. It is unnecessary to design antenna modules of multiple specifications for installation in the vertical housing, the horizontal housing, or the square housing having a different shape.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:
1. A non-contact card reader, comprising:
   an antenna module, comprising:
   a first board;
   a second board, comprising a surrounding area and a central area located at a center of the surrounding area;
   an antenna, disposed in the surrounding area; and
   multiple light-emitting components, located in the central area;
   a spacer, located between the first board and the second board, wherein the spacer comprises multiple spacer blocks;
   multiple light pipes, arranged at intervals and disposed between the first board and the second board, wherein the light pipes are combined with the spacer and the spacer blocks are located between the light pipes, ends of the light pipes respectively correspond to the light-emitting components, and other ends of the light pipes separately extend to a lateral end of the second board; and
   a panel housing, selected from the group consisting of a vertical housing, a horizontal housing, and a square housing, wherein the panel housing comprises: an accommodating slot for accommodating the antenna module and multiple light guide holes adjacent to the other ends of the light pipes, wherein
   the antenna module is installed in the vertical housing, the horizontal housing, or the square housing in a fixed direction.

2. The non-contact card reader according to claim 1, wherein the spacer comprises a slot, and the light-emitting components are disposed in the slot.

3. The non-contact card reader according to claim 1, wherein the antenna is symmetrically disposed in the surrounding area on one side of the second board.

4. The non-contact card reader according to claim 1, wherein the light-emitting components are disposed on the other side of the second board and are located between the first board and the second board.

5. The non-contact card reader according to claim 1, further comprising: a back cover, fastened on a side wall of the panel housing and covering the accommodating slot.

6. The non-contact card reader according to claim 1, wherein the panel housing comprises: multiple fixed blocks, located on an internal side of the accommodating slot and abutting on a lateral end of the antenna module.

7. The non-contact card reader according to claim 1, wherein the other ends of the light pipes extend out of the first board and the second board and obliquely extend toward a lateral end of the second board.

8. The non-contact card reader according to claim 1, wherein the other ends of the light pipes comprise a horizontal drawing segment corresponding to the light guide holes.

9. The non-contact card reader according to claim 1, wherein the other ends of the light pipes comprise a vertical drawing segment corresponding to the light guide holes.

* * * * *